United States Patent
Riddle et al.

[11] Patent Number: 5,927,511
[45] Date of Patent: Jul. 27, 1999

[54] FLAT SCREEN PANEL FOR CROWNED DECK VIBRATING SHAKER

[75] Inventors: Russell Allen Riddle, Chelsea; Terry L. Baltzer, Tulsa, both of Okla.

[73] Assignee: Southwestern Wire Cloth, Inc., Tulsa, Okla.

[21] Appl. No.: 09/108,019

[22] Filed: Jun. 29, 1998

[51] Int. Cl.[6] ...................................................... B07B 1/49
[52] U.S. Cl. ............................ 209/405; 209/409; 209/412
[58] Field of Search ................................. 209/412, 409, 209/408, 405, 403, 402, 399, 398, 401, 397

[56] References Cited

U.S. PATENT DOCUMENTS

| | | | |
|---|---|---|---|
| 1,886,173 | 11/1932 | Flint . | |
| 2,088,313 | 7/1937 | Wettlaufer | 209/403 |
| 2,723,032 | 11/1955 | Gisler et al. | 209/401 |
| 2,864,500 | 12/1958 | Miller | 209/408 X |
| 4,033,865 | 7/1977 | Derrick, Jr. | 209/275 |
| 4,380,494 | 4/1983 | Wilson | 209/412 X |
| 5,221,008 | 6/1993 | Derrick, Jr. et al. | 209/269 |
| 5,417,793 | 5/1995 | Bakula | 156/308 |
| 5,690,826 | 11/1997 | Cravello | 210/384 |

*Primary Examiner*—David H. Bollinger
*Attorney, Agent, or Firm*—Head, Johnson & Kachigian

[57] ABSTRACT

A screen assembly for a vibrating shaker having a crowned deck for receiving at least one screen assembly thereon and a plurality of attachment members. The screen assembly includes a rigid frame having a pair of parallel, opposed sides and a pair of parallel, opposed ends. An underside of the frame is radiused to match the crowned deck of the shaker. A top planar side of the rigid frame is opposed to the underside of the frame. At least one screen cloth layer is fixed to the planar top side of the frame for separating solid materials from liquids and fine solid particles.

25 Claims, 7 Drawing Sheets

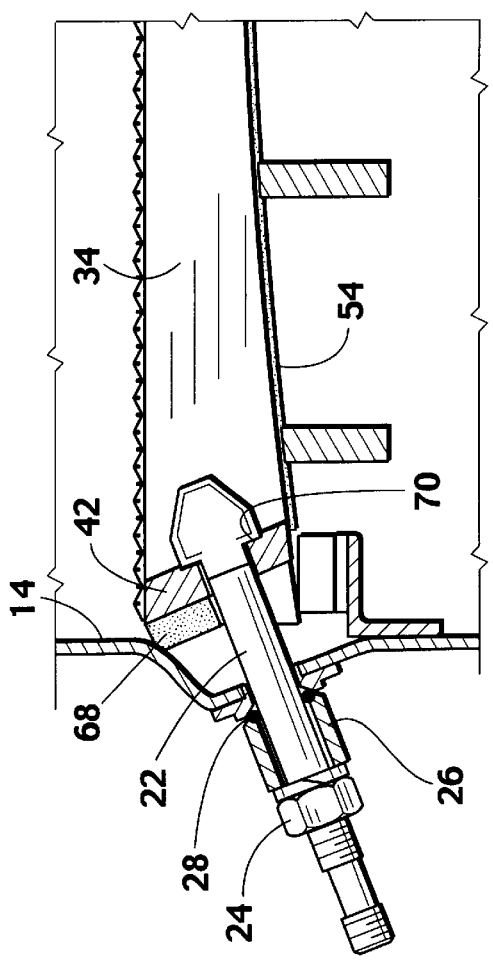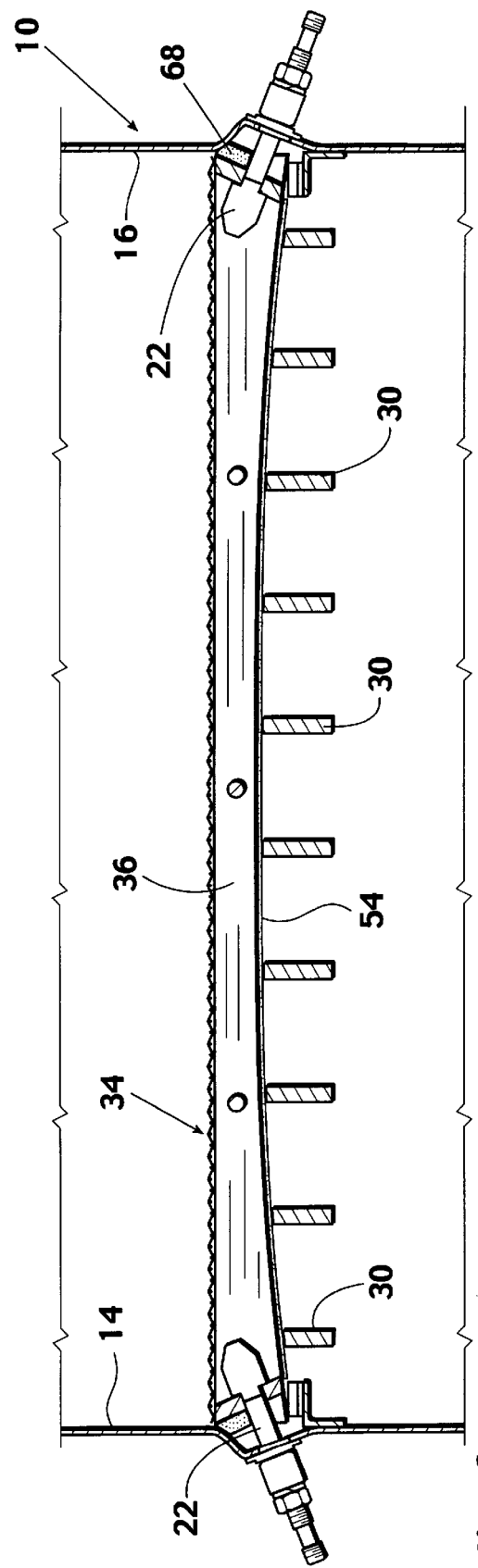
Fig. 8
Fig. 9

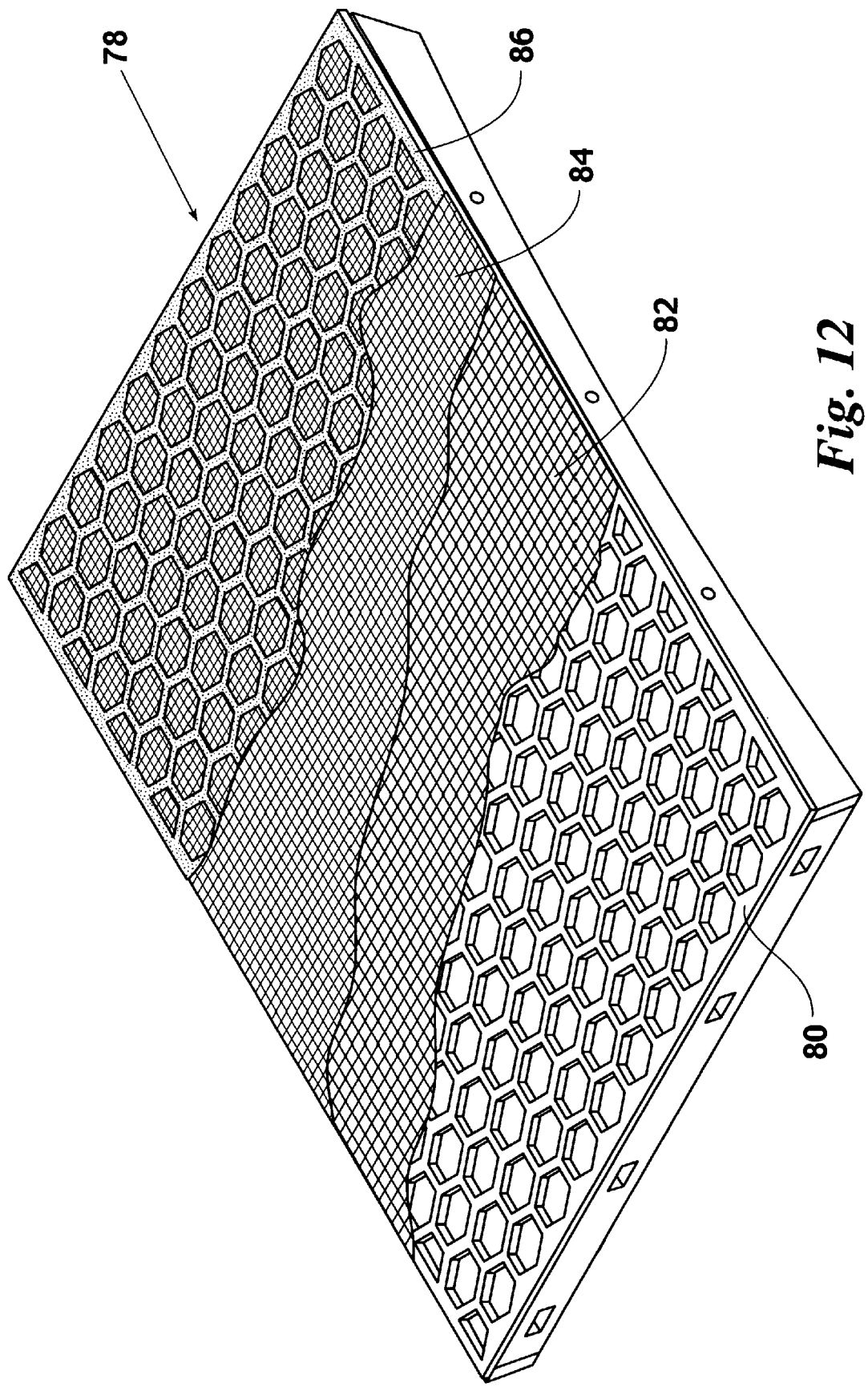

FLAT SCREEN PANEL FOR CROWNED DECK VIBRATING SHAKER

BACKGROUND OF THE INVENTION

1. Field of the Invention

The present invention relates to a replaceable screen assembly for a vibrating shaker having a crowned deck. In particular, the present invention is directed to a screen assembly having a rigid frame and a top planar screening surface for use with a crowned deck vibrating shaker.

2. Prior Art

Various types of designs and configurations of vibrating screen machines have been utilized in the past. These vibrating shakers are used as screening and separation devices in various industries, such as in the drilling and mining industries to recycle drilling mud. A drilling fluid or mud is circulated from the surface, down through a drill string and down to a drill bit. After use in the well bore, the drilling mud, along with debris and drill cuttings, is brought to the surface where it is screened to remove solids over a certain size.

A screen or screen assembly is detachably secured to the vibrating shaker machine. With the screen assembly or multiple screen assemblies secured in place, a tray is formed with the opposed, parallel sidewalls of the shaker. The drilling mud, along with drill cuttings and debris, is deposited on the top of the screen assembly at one side. The screen assembly is vibrated at a high frequency or oscillation by a motor or motors for the purpose of screening or separating materials placed on the screen and fed thereover. The liquid and fine particles will pass through the screen assembly by force of gravity and be recovered underneath. The solid particles above a certain size migrate and vibrate across the screen or screens where they are removed.

It is known that to obtain the proper vibration of the screen assembly, slackness in the screen cloth or cloths must be discouraged. Any slackness in the screen cloth provides an undesirable flapping action of the screen which diminishes the proper vibration and also results in increased wear of the screen cloth. Accordingly, it is known that the screen assembly should be securely and tightly held down to the vibrating machinery. At the same time, the screen assemblies are subject to stresses from the vibrating machinery and wear over time and require periodic replacement.

One type of attachment mechanism includes hooks on each longitudinal end of the screen assembly to connect to the vibratory shaker machine. The shaker will have a channel-shaped drawbar on each side which mates with a corresponding hook on the screen assembly. The drawbars are held in place by bolts or other fasteners. These are detachably connected so that the screens may be replaced from time to time.

The vibrating shaker may include a bed or deck composed of a plurality of parallel cushioned rails on which the screen assembly or screen assemblies rest. Rather than having the bed or deck for the screen assembly flat or horizontal, the bed may be modified to be arched, bowed or curved upward so that the screen cloth or screen assembly is stretched tightly over the arched or curved surface. The height of curvature of the deck may vary from one half to one inch (½" to 1") from the center to the sides.

An early example of a crowned bed shaker is shown in the 1932 Flint U.S. Pat. No. 1,886,173. With a crowned bed, the screen cloth or screen assembly must be flexible enough to conform to the arch in the deck. Additional features to maintain tautness include spring loaded tensioning bolts to prevent loosening as the screens or screen assemblies stretch and seat onto the deck.

The crowned deck and accompanying crowned screen assembly can cause uneven fluid coverage. Because of the crowned deck, the fluid and solids deposited on the screen assembly to be separated will first gather at the sides. Depending on the fluid level, the arched center of the screen assembly may be exposed. The drilling mud to be screened may extend further out along the sides of the shaker deck than at the center where maximum deck height occurs. This will reduce the effective screening area of the vibrating shaker and reduce the efficiency. This condition can also lead to mud losses at the discharge and contribute to unacceptable wet cuttings if the drilling fluid passes across the surface of the screen assembly without being screened.

Several measures have been employed in response thereto. Manufacturers have modified the vibrating shaker to vary and alter the pitch of the deck itself so the drilling fluid is moving uphill from its entry to discharge. For example, the bed or deck may be set at an incline angle of from 1° to 4°. In other words, the fluid moves across the screen assembly and moves uphill at the same time. The higher the deck angle, however, the lower the screen life since solids will move slower across the screen, abrading as they travel across the screen.

The crowned deck will result in the fluid to be screened forming a U-shape toward the discharge end of the shaker.

An alternate measure employed is to corrugate the screen assembly to provide ridges to contact the fluid and assist in channelling the fluid.

Accordingly, it is known that flat panel screens can run at a lower deck angle than arched decks but do not have the advantages of the curved or arched deck in promoting tensioning of the screen assembly.

It is, therefore, a principal object and purpose of the present invention to provide a screening assembly having a flat, top planar surface for screening of fluids and solids which will mate with a crowned deck vibrating shaker.

It is a further object and purpose of the present invention to provide a process to convert a crowned deck vibrating shaker to a flat panel vibrating shaker.

It is a further object and purpose of the present invention to provide a flat panel screen for a crowned vibrating shaker which will increase the fluid throughput and, thus, the efficiency of the vibrating shaker.

It is a further object and purpose of the present invention to provide a process to convert a hook screen vibrating shaker to a non-hook screen vibrating shaker.

SUMMARY OF THE INVENTION

The present invention provides a screen assembly for a vibrating shaker having a crowned deck.

The screen assembly includes a rigid frame which may be comprised of a one piece, integral member or may be composed of discreet members configured together. The rigid frame includes a pair of parallel, opposed sides and a pair of parallel, opposed ends. A plurality of cross supports extend between the ends and are parallel to each of the sides.

The rigid frame includes an underside which is radiused or arched to match the radius of the crowned deck. The underside of the rigid frame is supported by and rests on a series of cushion rails. The rails, taken together, form an arch and form a radius which mates with the underside of the frame. The rigid frame also includes a top, planar side which is opposed to the underside of the frame. A plurality of braces extend between the cross supports and between the opposed sides.

A fastening mechanism is provided to securely fasten the screen assembly to the vibrating shaker. Each of the frame ends contain a plurality of slots for attaching the screen assembly to the vibrating shaker. Each slot is slightly larger than the head of a T-head bolt which extends from a sidewall of the shaker. The T-head bolts will pass through the slots in the end of the frame. The head of each bolt will pass through the slot in one orientation but will not be permitted to pass through the slot in alternate orientations. Each bolt is locked into place by a threaded nut which is secured to the threaded end of the bolt and may have a rubber spacer or o-ring to help seal against fluid leakage.

Each end of the screen assembly is chamfered at the underside to accommodate the T-head bolt prior to its insertion into the slot. Each chamfered end may also include a gasket in order to assist in sealing the screen assembly with the sidewall of the vibrating shaker. Each end may also include a recess or indentation adjacent to each slot so that the T-head bolts will tend to orient itself in the locked position.

A screen cloth or a plurality of screen cloths are affixed to the top, planar side of the frame and may be tensioned thereon. In an alternate embodiment, a perforated metal plate is secured to the top, planar side of the frame with the screen cloths affixed thereon.

BRIEF DESCRIPTION OF THE DRAWINGS

FIG. 8 is an enlarged view of the attachment mechanism to attach the screen assembly to the vibrating shaker;

FIG. 9 is a sectional view of a screen assembly constructed in accordance with the present invention affixed to a vibrating shaker;

FIG. 12 is a perspective view of an alternate embodiment of the screen assembly of the present invention.

DETAILED DESCRIPTION OF THE PREFERRED EMBODIMENTS

Figure 1:
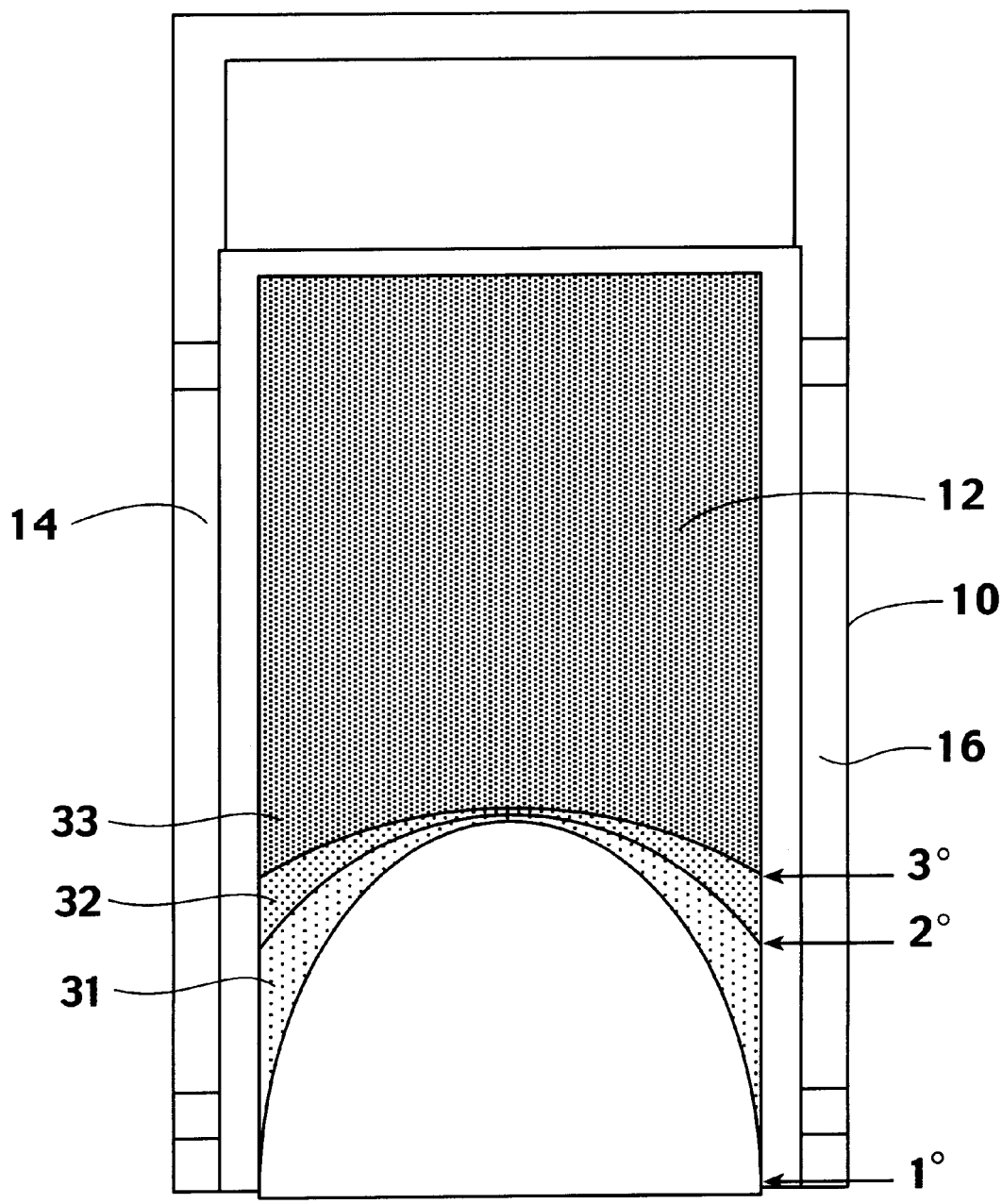
FIGS. 1 and 2 illustrate prior art screen assembly designs for vibrating shakers.
Figure 2:
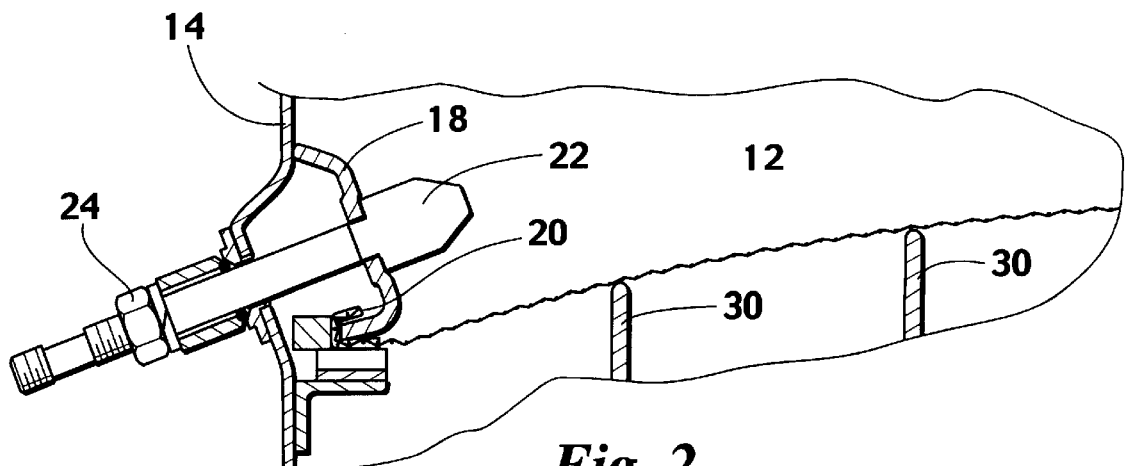
Figure 4:
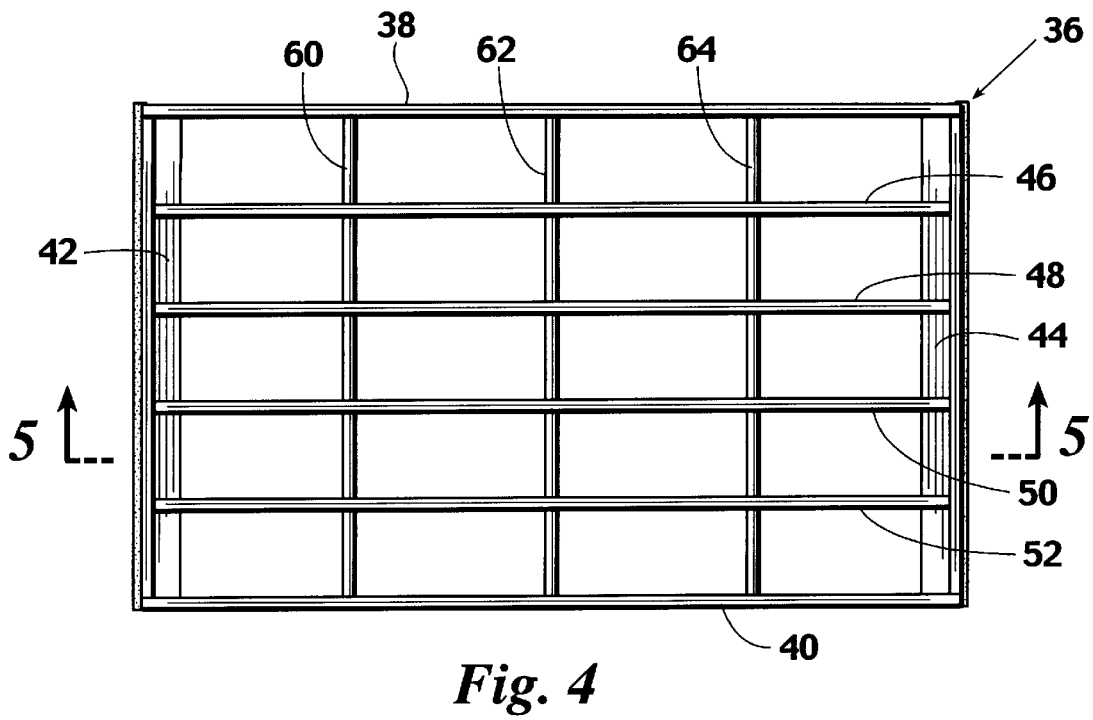
FIG. 4 is a top view of the rigid frame shown in FIG. 3.

Referring to the drawings in detail, FIGS. 1 and 2 illustrate an example of existing, prior art screen assembly designs. FIG. 1 illustrates a top view of a portion of a vibrating shaker 10 having a crowned deck on which is mounted a hook screen assembly 12. The screen assembly 12 is mounted between a pair of sidewalls 14 and 16, one of which is seen in the partial, sectional view of FIG. 2.

A pair of channel-shaped drawbars 18, one of which is seen in section in FIG. 2, clamp in and retain opposed hooks 20, one of which is seen in FIG. 2, which form the ends of the screen assembly 12.

The channel-shaped drawbars 18 are held in place by a plurality of threaded T-head bolts 22 which pass through openings in the drawbars 18 and openings in the sidewall 14. Threaded nuts 24 or other fasteners retain the T-head bolts in place. A rubber O-ring gasket 26 may be juxtaposed between the sidewall 14 and the nut.

In order to replace the screen assembly 12, the nuts 24 are loosened from the T-head bolts 22 so that the drawbars 18 are loosened. The hooks 20 are then disengaged from the drawbars so that the screen assembly 12 or screens may be removed. The replacement screen assembly can then be inserted and tightened down.

The arched position of the screen assembly 12 may best be observed in FIG. 2. A series of parallel, cushioned rails 30 retain and support the screen assembly.

The fluid to be separated will be placed on top of the screen assembly. The deck may not only be arched but may be moved to differing inclined positions. The fluid coverage on the screen assembly illustrates three different inclines, as indicated by shaded areas 31, 32 and 33. The shaded area 31 shows the deck at a 1° incline. The shaded area 32 shows the deck at a 2° incline while the shaded area 33 shows the deck at a 3° incline.

The present invention provides a screen assembly 34 for a crowned deck vibrating shaker which will replace the prior art screen configuration shown in FIGS. 1 and 2.

Figure 3:
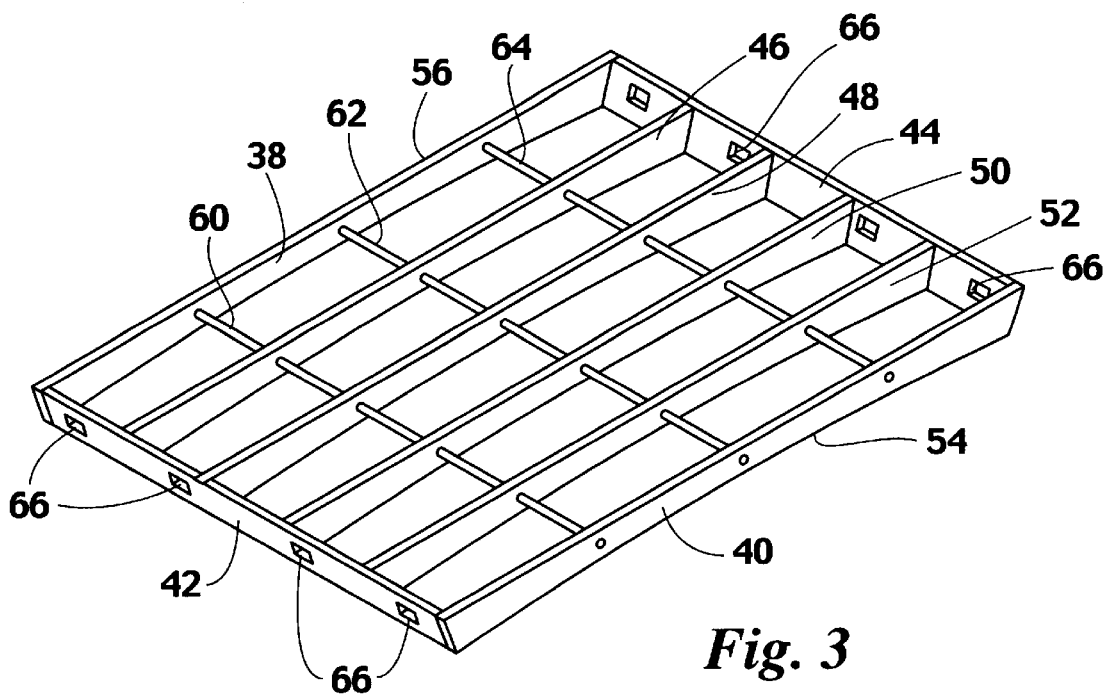
FIG. 3 is a perspective view of a rigid frame for a screen assembly constructed in accordance with the present invention apart from the screen cloths.

FIG. 3 is a perspective view of a rigid frame 36 which is a part of the screen assembly 34 of the present invention. FIGS. 4 through 7 illustrate different views of the rigid frame 36 apart from the rest of the screen assembly. The rigid frame may be comprised of a one piece, single, integral member or may be composed of various members configured together. The rigid frame may be fabricated from steel, aluminum, plastics, rubbers or fiberglass and may be manufactured by various processes, such as by injection molding, compression molding or pultrusion.

The rigid frame 36 includes a pair of parallel, opposed sides 38 and 40 and a pair of parallel, opposed ends 42 and 44. The sides in the present embodiment are longer than the ends to form an elongated rectangle but it will be understood that other configurations, such as a square, are possible within the scope of the invention. A plurality of cross supports 46, 48, 50 and 52 extend between the ends 42 and 44 and are parallel to the sides 38 and 40. The number of cross supports will vary with the size and design and the invention is not limited to a particular number of cross supports.

Figure 5:
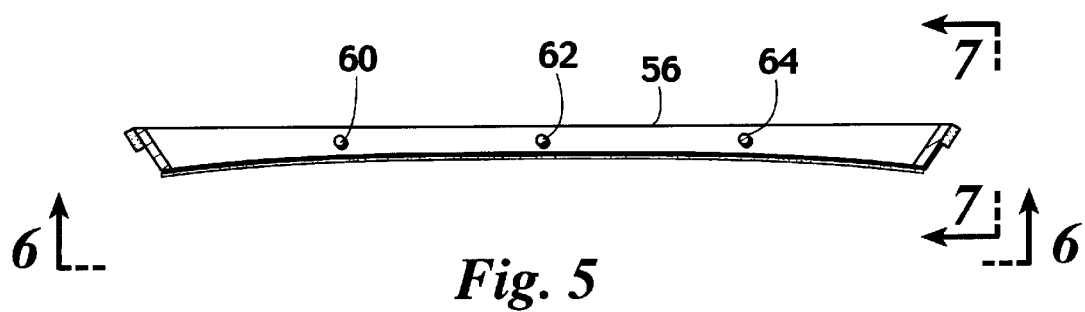
FIG. 5 is a sectional view taken along section line 5—5 of FIG. 4.

As best seen in FIGS. 3 and 5, the rigid frame 36 includes an underside 54 which is radiused or arched to match the radius of the crowned deck. Additionally, each of the cross supports has an underside which is arched or radiused to match the crowned deck. The rigid frame 36 also includes a top, planar side 56 which is opposed to the underside 54 of the frame.

A plurality of braces 60, 62 and 64 extend between the cross supports and between the cross supports and the opposed sides. The braces in the present embodiment are perpendicular to the sides and to the cross supports but might run diagonally. The braces in the present embodiment are not flush with the top but could be.

A fastening mechanism is provided to securely fasten the screen assembly to the vibrating shaker. Each of the frame ends 42 and 44 contain a plurality of slots 66 for attaching the screen assembly. Each slot is slightly larger than the head of the T-head bolt 22. Alternately, the slots 66 may take the form of notches (not shown) in the ends.

Figure 6:
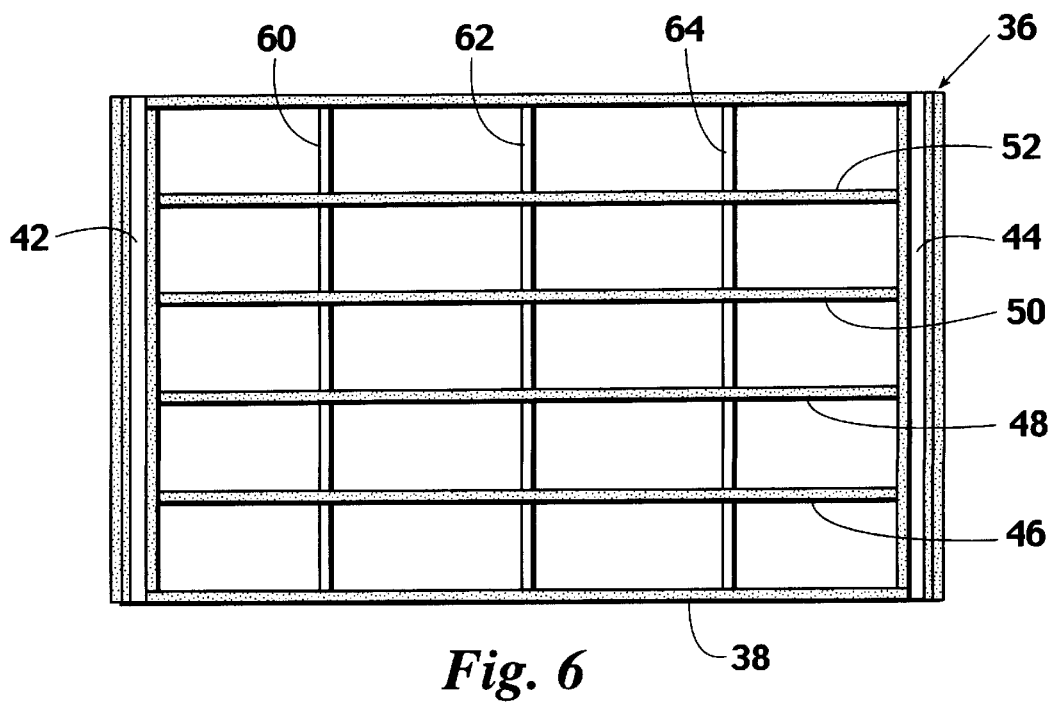
FIG. 6 is a bottom view of the rigid frame shown in FIGS. 3, 4 and 5.

With specific reference to FIG. 6, the underside 54 of the rigid frame 36 may be covered with a resilient material 68.

FIGS. 8 and 9 illustrate a preferred form of removable attachment of the screen assembly 34 to the vibrating shaker.

FIG. 8 shows the screen assembly 34 attached to the vibrating shaker 10 between the sidewalls 14 and 16. The underside 54 of the frame 36 is supported by and rests on a series of cushioned rails 30. The rails, taken together, form an arch and form a radius which mates with the underside 54 of the frame. The arch in the present embodiment runs from end to end although other orientations are possible within the scope of the invention.

Figure 7:
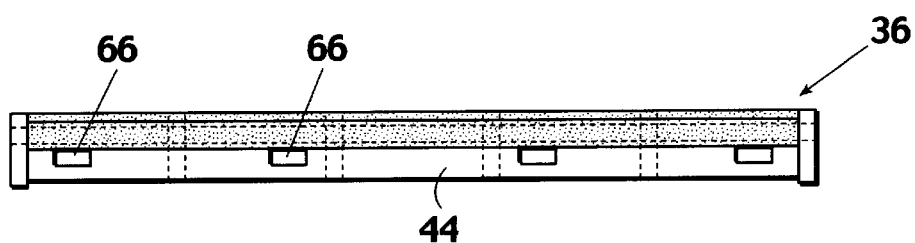
FIG. 7 is an end view of the rigid frame shown in FIGS. 3, 4, 5 and 6.

A T-head bolt 22 is illustrated in enlarged form in FIG. 8. The T-head bolt passes through the slot 66 in the end 42 of the frame 36. The T-head of the bolt will pass through the slot 66 in one rotational orientation but will not be permitted to return out of the slot in an alternate rotational orientation as shown in FIGS. 7 and 8. For example, the bolt 22 may pass through the slot 66 in one orientation but be prohibited from returning if rotated 90°. The bolt 22 also passes through an opening in the sidewall 14 of the vibrating shaker. It is locked in place by a threaded nut 24 which is secured to the threaded end of the bolt 22 and may have a spacer 26 and O-ring 28.

Each end 42 and 44 of the screen assembly 345 is chamfered at the underside to accommodate the T-head bolts 22 prior to its insertion into and through the slot 66. In other words, the heads of the bolts will reside in the space chamfered away while the screen assembly is lowered onto the deck. Each chamfered end includes a gasket 68 in order to seal the screen assembly 34 with the sidewall 14 of the vibrating shaker.

In order to install the screen assembly 34 on a crowned deck vibrating shaker, the pair of drawbars 18 described in connection with the prior art are removed by unthreading and loosening the T-head bolts from the nuts 24. Thereafter, the screen assembly 34 is lowered onto the arched deck of the shaker so that the underside 54 rests against the rails 30. Each head of the attachment bolts 22 is then inserted through a slot opening in the end. Each T-head bolt is rotated approximately 90°. The end 42 may also include a recess or indentation 70 adjacent each slot 66 so that the T-bolt head will tend to orient itself in the locked position. The threaded nut 24 is then tightened on the bolt 22.

The drawbars, which will trap debris and mud, are, thus, not required with the present invention. Elimination of the drawbars results in quicker and easier screen assembly replacement.

Alternatively, the screen assembly 34 may be removably attached to the vibrating shaker by wedge blocks (not shown) as will be described in a further embodiment below.

Figure 10:
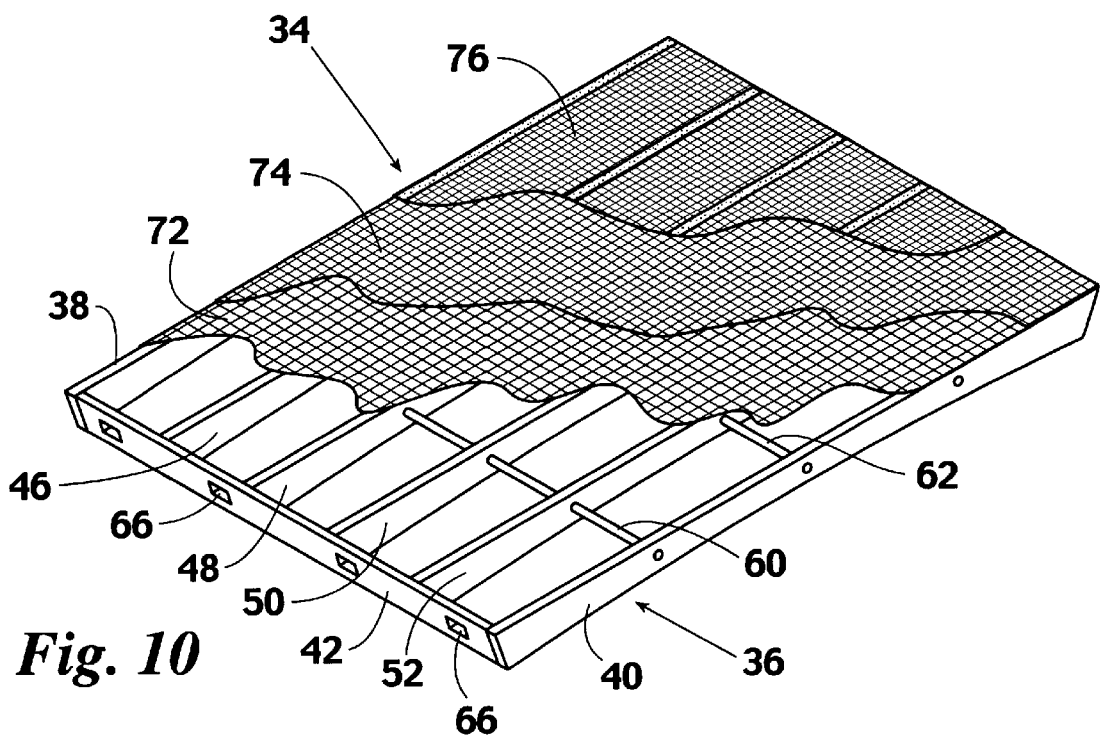
FIGS. 10 and 11 illustrate a perspective view of the screen assembly of the present invention apart from the vibrating shaker.
Figure 11:
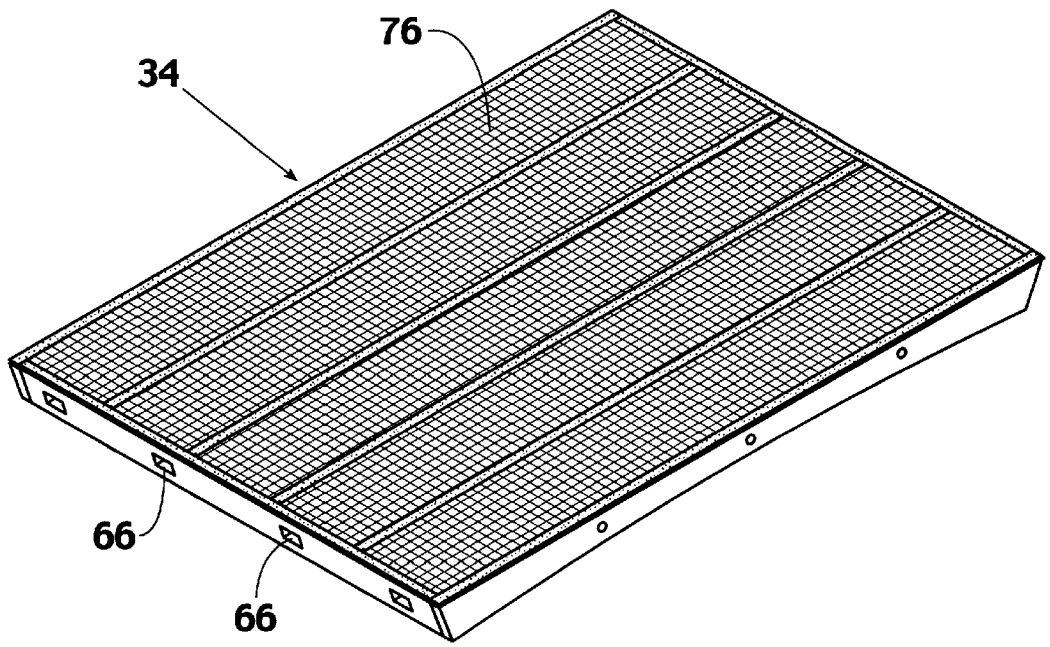
Figure 14:
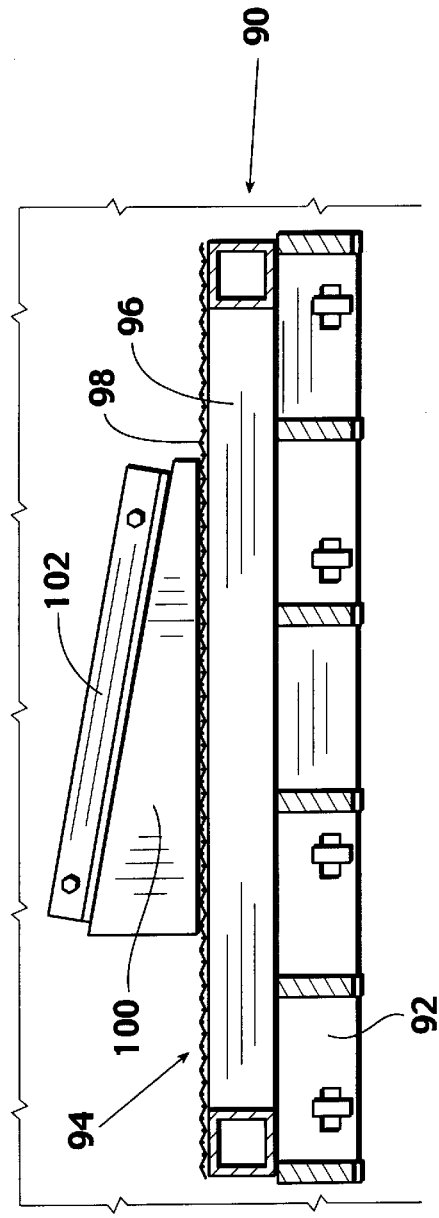
FIGS. 13 and 14 illustrate a further alternate embodiment of the present invention.

FIGS. 10 and 11 illustrate one embodiment of the screen assembly 34 wherein a plurality of screen cloths 72, 74, and 76 are affixed to the top, planar side of the frame and tensioned thereon. FIG. 10 shows the screen cloths partially cut-away for clarity. A coarse backing layer 72 will mate with the frame, a fine middle layer 74 will be placed thereover, and a fine top layer 76 will go on top. The screen cloths are stretched and tensioned to the frame and then affixed with epoxy or other adhesive. It will be appreciated that a lesser or greater number of screen cloths might be used.

FIG. 12 illustrates an alternate embodiment 78 of the present invention wherein a perforated plate 80 is secured to the top, planar side of the frame with the screen cloths affixed thereon.

A perforated plate 80 is mounted on and secured to the top, planar side of the rigid frame. A screen cloth or multiple screen cloths 82, 84 and 86 are then secured on top of the perforated plate.

Figure 13:
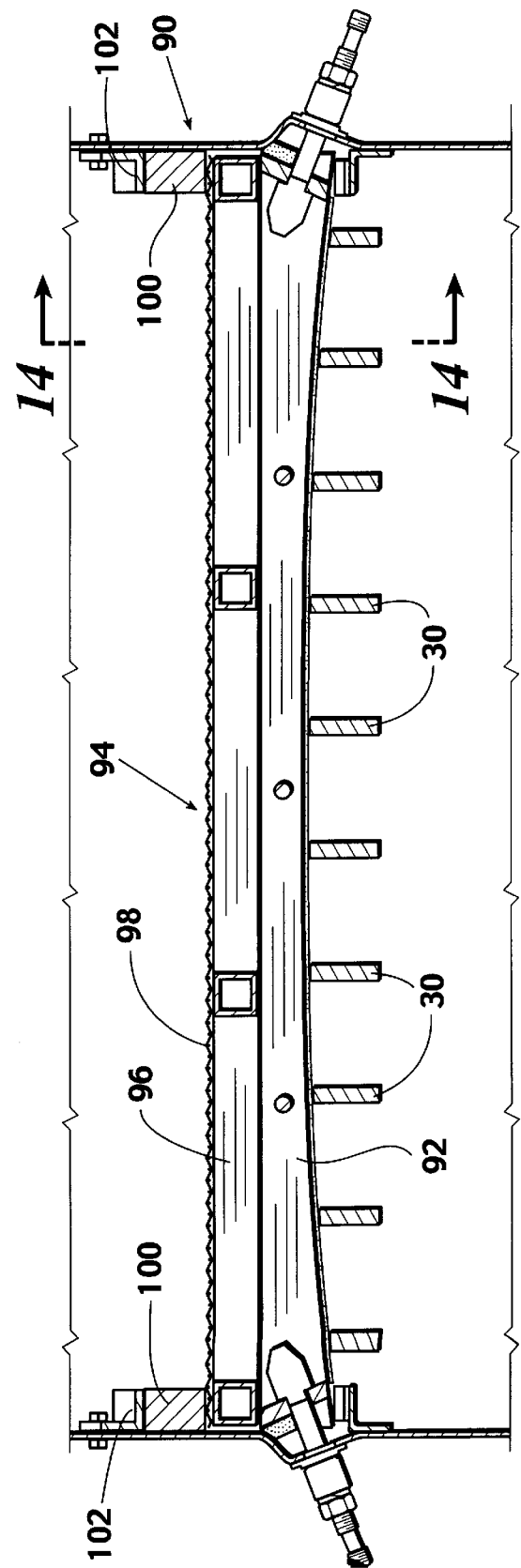

FIG. 13 illustrates an alternate embodiment 90 of the present invention.

A rigid frame 92 is constructed similar to the prior embodiments disclosed. Once the drawbars have been removed and the frame 92 is installed on the rails 30, a flat planar deck is created. In this embodiment, no screen cloth or screen cloths are affixed to the top, planar side of the frame 92. Instead, a separate, disposable screen 94 is affixed to the contoured frame 90. The disposable screen 94 includes a tubular support frame 96 which rests on the top planar side. A screen cloth or multiple screen cloths 98 are secured to the tubular support frame 96. Other types of flat screens or screen assemblies might also be used.

The screen 94 is held in place by a pair of wedge blocks 100 which are wedged or forced between the top of the screen and angle iron 102 extending from the sidewall of the shaker. Alternately, the screen 94 may be secured to the rigid frame 92 by fasteners (not shown).

The present invention in any of its embodiments eliminates the necessity of a crowned deck and permits a lower deck incline angle. The uneven U-shaped fluid coverage is eliminated, resulting in increased throughput. This allows the use of finer screens, if desired, while maintaining fluid capacity requirements.

Whereas, the present invention has been described in relation to the drawings attached hereto, it should be understood that other and further modifications, apart from those shown or suggested herein, may be made within the spirit and scope of this invention.

What is claimed is:

1. A screen assembly for a vibrating shaker having a crowned deck for receiving at least one screen assembly thereon and having a plurality of attachment members, which screen assembly comprises:

a frame having a pair of parallel, opposed sides and a pair of parallel, opposed ends;

an underside of said frame radiused to match said crowned deck;

a top, planar side of said frame opposed to said underside; and at least one screen cloth layer fixed to said planar top side of said frame for separating solid materials from liquids and fine solid particles.

2. A screen assembly for a vibrating shaker as set forth in claim 1 wherein said opposed sides have undersides which are radiused to match said crowned deck.

3. A screen assembly for a vibrating shaker as set forth in claim 2 including a plurality of cross supports extending between said ends parallel to said sides, each said cross support having undersides which are radiused to match said crowned deck.

4. A screen assembly for a vibrating shaker as set forth in claim 3 including a plurality of braces extending between said cross supports.

5. A screen assembly for a vibrating shaker as set forth in claim 3 wherein said frame and cross supports are rigid and fabricated as a single integral member.

6. A screen assembly for a vibrating shaker as set forth in claim 1 wherein said at least one screen layer is tensioned to said planar top side of said frame.

7. A screen assembly for a vibrating shaker as set forth in claim 6 including a plurality of braces extending between said cross supports.

8. A screen assembly for a vibrating shaker as set forth in claim 1 including three said screen cloth layers bonded to said planar top side of said frame.

9. A screen assembly for a vibrating shaker as set forth in claim 1 including a perforated plate secured to said planar top side of said frame wherein said at least one screen layer is affixed to said perforated plate.

10. A screen assembly for a vibrating shaker as set forth in claim 9 including three said screen cloth layers bonded to said perforated plate.

11. A screen assembly for a vibrating shaker as set forth in claim 1 wherein said vibrating shaker includes a pair of sidewalls, wherein said shaker attachment members are T-head bolts which are retained by said sidewalls, and wherein said screen assembly includes a plurality of openings through said frame opposed ends in order to receive said bolts therethrough.

12. A screen assembly for a vibrating shaker as set forth in claim 11 including a recess adjacent each said opening in each said end to act as a guide for engaging said T-head bolts.

13. A screen assembly for a vibrating shaker as set forth in claim 11 wherein each said end opening is a slot.

14. A screen assembly for a vibrating shaker as set forth in claim 1 wherein each said opposed frame end is chamfered from said top planar side toward said underside.

15. A screen assembly for a vibrating shaker as set forth in claim 14 wherein each said chamfered end includes a gasket to seal with a sidewall of said vibrating shaker.

16. A screen assembly as set forth in claim 1 wherein said opposed sides are joined to said opposed ends and wherein each said side extends beyond said end.

17. A screen assembly as set forth in claim 1 wherein said frame underside includes a gasket to mate with said crowned deck.

18. A method to convert a crowned deck vibrating shaker having a radiused deck to a flat screen vibrating shaker, which method comprises:

mating a rigid frame having a radiused underside and a top planar side to said crowned deck of said shaker;

inserting a plurality of attachment bolts extending from said shaker through openings in said frame ends;

engaging said attachment bolts extending from said shaker with said frame ends; and tightening said attachment bolts to retain said screen assembly to said shaker.

19. A method to convert a crowned deck vibrating shaker as set forth in claim 18 including the additional, initial step of removing a pair of channel-shaped drawbars from said shaker.

20. A method to convert a crowned deck vibrating shaker as set forth in claim 18 including the additional, initial step of forming said rigid frame as a single, integral member.

21. A method to convert a hook screen vibrating shaker as set forth in claim 20 including the step of providing recesses in each said opposed end adjacent each said opening as a guide for engaging said attachment members with said screen assembly.

22. A method to convert a crowned deck vibrating shaker as set forth in claim 18 including the additional, initial step of molding said rigid frame as a single, integral member.

23. A method to convert a hook screen vibrating shaker having a pair of sidewalls, a pair of drawbars and a plurality of attachment members, to a non-hook screen vibrating shaker, which method comprises:

removing said pair of drawbars from said vibrating shaker;

inserting said attachment members through openings in opposed ends of a screen assembly;

engaging said attachment members with said screen assembly; and tightening said attachment members to retain said screen assembly.

24. A screen assembly for a vibrating shaker having a crowned deck for receiving at least one screen assembly thereon, which screen assembly comprises:

a frame having a pair of parallel, opposed sides and a pair of parallel, opposed ends;

an underside of said frame radiused to match said crowned deck;

a top, planar side of said frame opposed to said underside;

an attachment mechanism to attach said frame to said shaker; and a replaceable screen detachably secured to said rigid frame.

25. A screen assembly as set forth in claim 24 wherein said attachment mechanism includes a pair of wedge blocks which are wedged between angle irons extending from sidewalls of said shaker and said replaceable screen.

* * * * *